(12) United States Patent
Jabbour et al.

(10) Patent No.: US 9,477,986 B2
(45) Date of Patent: Oct. 25, 2016

(54) EFFICIENT DETECTION AND ANALYSIS OF VARIANCES

(75) Inventors: Imad Jabbour, Belmont, CA (US);
Mei Siauw, Redwood City, CA (US);
Anil Kumar Desu, Hyderbad (IN);
David Haimes, Belmont, CA (US);
Robert C. Zwiebach, San Mateo, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 339 days.

(21) Appl. No.: 13/477,862

(22) Filed: May 22, 2012

(65) Prior Publication Data

US 2013/0073438 A1  Mar. 21, 2013

Related U.S. Application Data

(60) Provisional application No. 61/536,941, filed on Sep. 20, 2011.

(51) Int. Cl.
*G06Q 40/02* (2012.01)
*G06Q 40/00* (2012.01)

(52) U.S. Cl.
CPC .................................... *G06Q 40/00* (2013.01)

(58) Field of Classification Search
CPC ...... G06Q 40/10; G06Q 40/02; G06Q 40/00; G06Q 30/04; G06Q 20/10
See application file for complete search history.

(56) References Cited

U.S. PATENT DOCUMENTS

| 8,271,386 B2* | 9/2012 | Seay et al. ...................... 705/44 |
| 2010/0217725 A1* | 8/2010 | Clyne et al. ................ 705/36 R |
| 2011/0184851 A1* | 7/2011 | Megdal et al. ................. 705/38 |

* cited by examiner

*Primary Examiner* — Luna Champagne

(57) ABSTRACT

A method of detecting variances in a plurality of accounts from different organizations within an Enterprise Financial Accounting system includes receiving a selection of a first account with an account type; receiving a selection of a first time interval and a second time interval; determining a first amount that is associated with the first account during the first time interval; determining a second amount that is associated with the first account during the second time interval; receiving a selection of a comparison operator that relates the first amount to the second amount; receiving a selection of a threshold; determining a comparison value by comparing the first amount to the second amount according to the comparison operator; determining that the comparison value violates the threshold according to the comparison operator; and displaying a first indication in a portal comprised of the first amount, the second amount, and the comparison value.

20 Claims, 9 Drawing Sheets

FIG. 7

EFFICIENT DETECTION AND ANALYSIS OF VARIANCES

CROSS-REFERENCES TO RELATED APPLICATIONS

The present application claims benefit under 35 USC 119(e) of U.S. Provisional Application No. 61/536,941, filed on Sep. 20, 2011 by Jabbour et al, and entitled "Mechanism To Proactively Monitor Financial Balances And Automatically Convey Financial Impact Of Balance Variances Based On The Account Type (I.E. Expense-Revenue-Asset Etc.)," of which the entire disclosure is incorporated herein by reference for all purposes.

BACKGROUND

Enterprise resource planning (ERP) systems integrate internal and external management information across an entire organization. ERP systems may embrace finance/accounting, manufacturing, sales and service, customer relationship management, human resource management, and the like. ERP systems may be used to automate activities between these different resources within an integrated software application. One purpose may be to facilitate the flow of information between business functions across boundaries of an organization, and to manage the connections between outside stakeholders and internal resources.

Each resource within an ERP system may include many subsystems to manage various resources. For example, a finance/accounting application in an ERP system may be distributed among many different departments within an organization, and may be used to manage many different types of financial accounts. These different types of financial accounts may be managed using different products in the ERP system. Each of these products are usually specially tailored to handle one particular type of financial account. For example, an asset ledger may be used to track the accounting status of business assets. Although these different products are designed to handle specific accounts, each of them may be relevant when detecting accounting variances across an organization.

BRIEF SUMMARY

In one embodiment, a method of detecting variances in a plurality of accounts from different organizations within an Enterprise Financial Accounting system is presented. The method may include receiving a selection of a first account in the plurality of accounts, where the first account may be associated with an account type. The method may also include receiving a selection of a first time interval and a second time interval. The method may additionally include determining a first amount that is associated with the first account during the first time interval, and determining a second amount that is associated with the first account during the second time interval. The method may further include receiving a selection of a comparison operator, where the comparison operator may relate the first amount to the second amount, and receiving a selection of a threshold. The method may also include determining a comparison value by comparing the first amount to the second amount according to the comparison operator, and determining that the comparison value violates the threshold according to the comparison operator. The method may additionally include displaying, in response to determining that the comparison value violates the threshold, a first indication in a portal in the Enterprise Financial Accounting system. In one embodiment, the indication may be comprised of the first amount, the second amount, and the comparison value.

In one embodiment, the method may also include determining that the comparison value represents a net increase in an expected value of the first account based on the account type of the first account, and displaying a second indication in response to determining that the comparison value represents the net increase. The account type of the first account may comprise an expense or a liability, and the comparison value may comprise a decrease in a balance of the first account. Alternatively or additionally, the account type of the first account may comprise an asset or a revenue, and the comparison value may comprise an increase in a balance of the first account.

In another embodiment, the method may also include determining that the comparison value represents a net decrease in an expected value of the first account based on the account type of the first account, and displaying a third indication in response to determining that the comparison value represents the net decrease. The account type of the first account may comprise an expense or a liability, and the comparison value may comprise an increase in a balance of the first account. Alternatively or additionally, the account type of the first account may comprise an asset or a revenue, and the comparison value may comprise a decrease in a balance of the first account.

In yet another embodiment, the first time interval may comprise an accounting period. The first amount may comprise a balance in the first account. The comparison operator may at least in part determine a percentage change between the first amount and the second amount. Each step of the method may be performed by a computer system.

In another embodiment, a computer-readable memory is presented. The memory may have stored thereon a sequence of instructions which, when executed by one or more processors, causes the one or more processors to detect variances in a plurality of accounts from different organizations within an Enterprise Financial Accounting system by receiving a selection of a first account in the plurality of accounts, where the first account is associated with an account type. The one or more processors may also operate by receiving a selection of a first time interval and receiving a selection of a second time interval. The one or more processors may further operate by determining a first amount that is associated with the first account during the first time interval, and determining a second amount that is associated with the first account during the second time interval. The one or more processors may additionally operate by receiving a selection of a comparison operator, where the comparison operator relates the first amount to the second amount. The one or more processors may also operate by receiving a selection of a threshold, and determining a comparison value by comparing the first amount to the second amount according to the comparison operator, and determining that the comparison value violates the threshold according to the comparison operator. The one or more processors may further operate by displaying, in response to determining that the comparison value violates the threshold, a first indication in a portal in the Enterprise Financial Accounting system, where the indication may be comprised of the first amount, the second amount, and the comparison value.

In another embodiment, a system including one or more processors and a memory is presented. The memory may be communicatively coupled with and readable by the one or more processors, and may have stored therein a sequence of instructions which, when executed by the one or more processor, cause the one or more processor to detect variances in a plurality of accounts from different organizations within an Enterprise Financial Accounting system by receiving a selection of a first account in the plurality of accounts, where the first account is associated with an account type. The one or more processors may also operate by receiving a selection of a first time interval and receiving a selection of a second time interval. The one or more processors may further operate by determining a first amount that is associated with the first account during the first time interval, and determining a second amount that is associated with the first account during the second time interval. The one or more processors may additionally operate by receiving a selection of a comparison operator, where the comparison operator relates the first amount to the second amount. The one or more processors may also operate by receiving a selection of a threshold, and determining a comparison value by comparing the first amount to the second amount according to the comparison operator, and determining that the comparison value violates the threshold according to the comparison operator. The one or more processors may further operate by displaying, in response to determining that the comparison value violates the threshold, a first indication in a portal in the Enterprise Financial Accounting system, where the indication may be comprised of the first amount, the second amount, and the comparison value.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 7 illustrates an interface may be used as an account monitoring interface, according to one embodiment.

DETAILED DESCRIPTION

Figure 1:
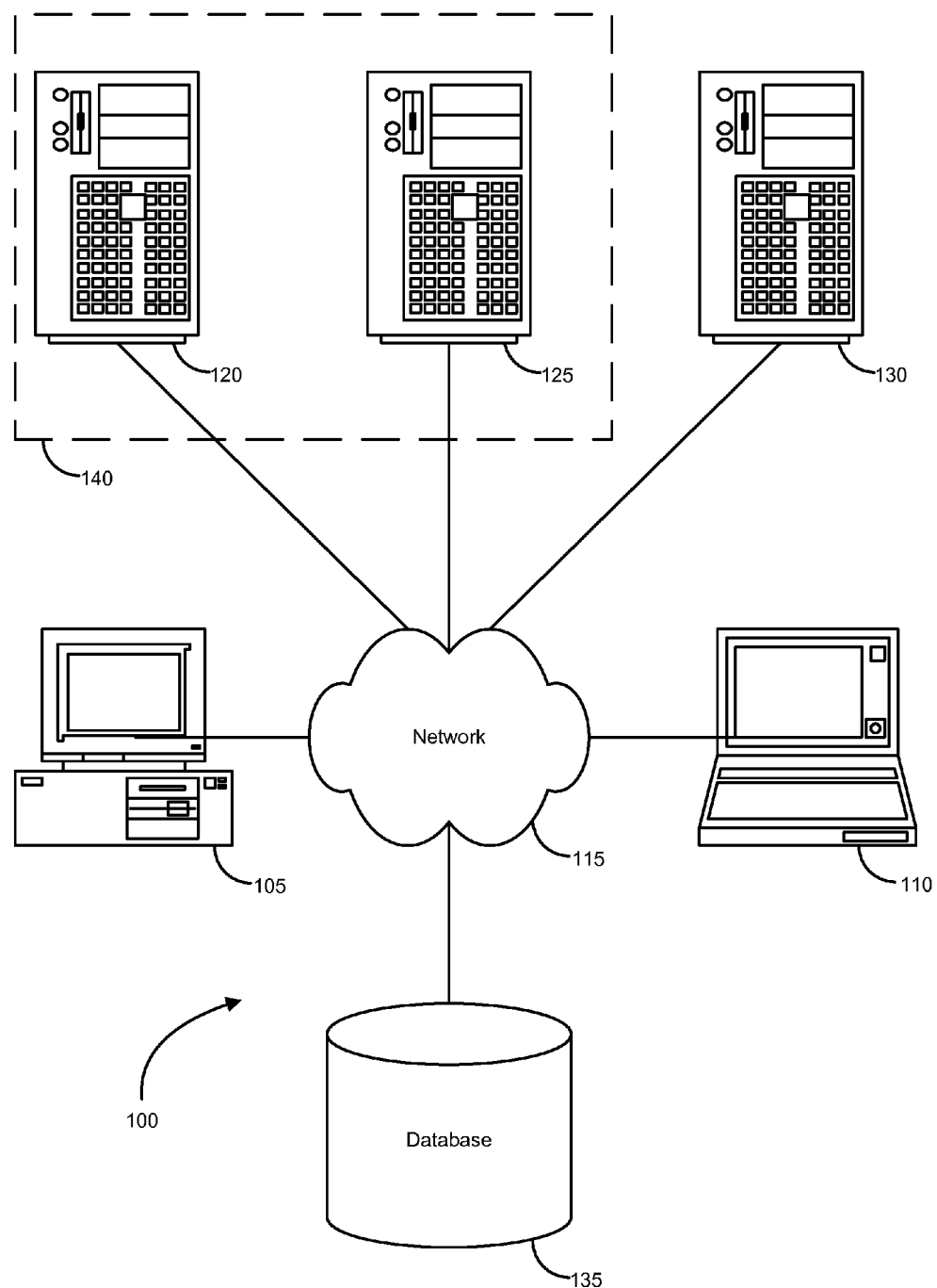
FIG. 1 illustrates a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Described herein, are embodiments for detecting and monitoring variances in a plurality of selected accounts. An account or group of accounts may be selected for monitoring. Two time intervals may also be selected, one of which may often be the current time period. The second time interval may be the previous accounting period, or any other period of time. Monitoring criteria, such as a comparison operator and a threshold may also be selected. Account activity in each of the two time intervals may be compared according to the comparison operator and the threshold. In any accounts for which the threshold is violated according to the comparison operator, these accounts may be displayed in a portal within an Enterprise accounting system. Additionally, embodiments described herein may also determine whether the threshold violation positively or negatively affects the organization's balance sheet. This determination may be based on the type of account. For example, if an income account is monitored to detect a 5% decrease between consecutive accounting periods, it may be automatically determined that such a threshold violation represents an increased value of the account because it is an asset. On the other hand, a 5% increase in expense account may be automatically determined to represent a decrease value of the account even though the balance has increased.

In an Enterprise Resource Planning (ERP) system, different software modules may be used to describe each type of account. For example, accounts may be available for receivables, purchasing, costing, projects, payables, assets, and/or the like. Often, each of these accounts may be used primarily by a department within an organization responsible for that type of account. For example, a payables account may be used by an accounts payable department, and a purchasing account may be used by a purchasing department. During the day-to-day activities of the separate departments, there may be little need to know the status of the accounts associated within the other departments. Consequently, each department may manage the accounts separately. Therefore, each account may have a dedicated user interface for this task with product specific business rules that determine when a period may be opened and/or closed.

However, when analyzing the fiscal status of an entire organization, the status of each account may be of interest. To provide a more consistent user experience and to provide more visibility in the organization to review account statuses across products, departments, and organizations, it may be beneficial to provide a unified user interface in an ERP system for managing accounting statuses that can be used by the entire realization, along with each individual account. A unified account monitoring interface may provide users with greater visibility of the statuses of multiple accounts and ledgers accessible from a single interface. The single interface may have a consistent period management scheme, a common format for data presentation, and unified general business rules across multiple products. This may deliver uniformity in user experience that may not be possible using separate interfaces for each type of account.

As used herein, the term "account monitoring interface" may be used to describe any user interface that provides an account status for selected accounts throughout an organization. The account monitoring interface may be textual, and indications may be textual descriptions of the various accounts. In another embodiment, the account monitoring interface may be graphical, and indications may be in the form of graphical icons that may be selected by an input device. The account monitoring interface may be provided on many possible output devices. In one embodiment, the account monitoring interface may be provided on a computer screen, while other embodiments may use the screen on a mobile phone, a laptop computer, a projector, a tablet computer, a PDA, and/or the like.

In some embodiments, the account monitoring interface may provide both a summary and detailed view of the status information for various accounts. A summary view may cut across a broad set of information at an overview level. It may show the status of a selected range of periods for all of the monitored accounts, including a selected accounting period, as well as a period before and/or after the selected period. Status changes may be effected and seen across the various accounts from the account monitoring interface with a single request. At the same time, a user may drill down into the status details of a particular account to more closely review the status of each individual account.

Today, controllers, general accounting managers, and ledger managers need to run multiple financial statements and reports to monitor account balances. Instead of constantly running and reviewing reports to see if a critical threshold has been breached in one or more accounts, it may be beneficial to provide a single interface and reporting system to keep managers abreast of any critical financial situations. By allowing users to specify threshold limits for key accounts, and to be notified when the account balance violates the specified threshold, managers may be able to more actively monitor their businesses and be alerted to variances. For example, if a cash account balance dropped by more than 20% in account compared to the previous period, users may want to be notified of this as soon as possible to take proactive measures.

Comparing the financial performance for an account between accounting periods and over different time ranges may provide critical information. The comparison of relative data points provides both orientation and context for users to understand how accounts are functioning over time. The account monitoring interface may include the flexibility for users to decide the most meaningful metrics and measurements for each type of account.

The embodiments disclosed herein may be implemented in a computer system. FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10 g, that is adapted to store, update, and retrieve data in response to SQL-formatted commands.

Figure 2:
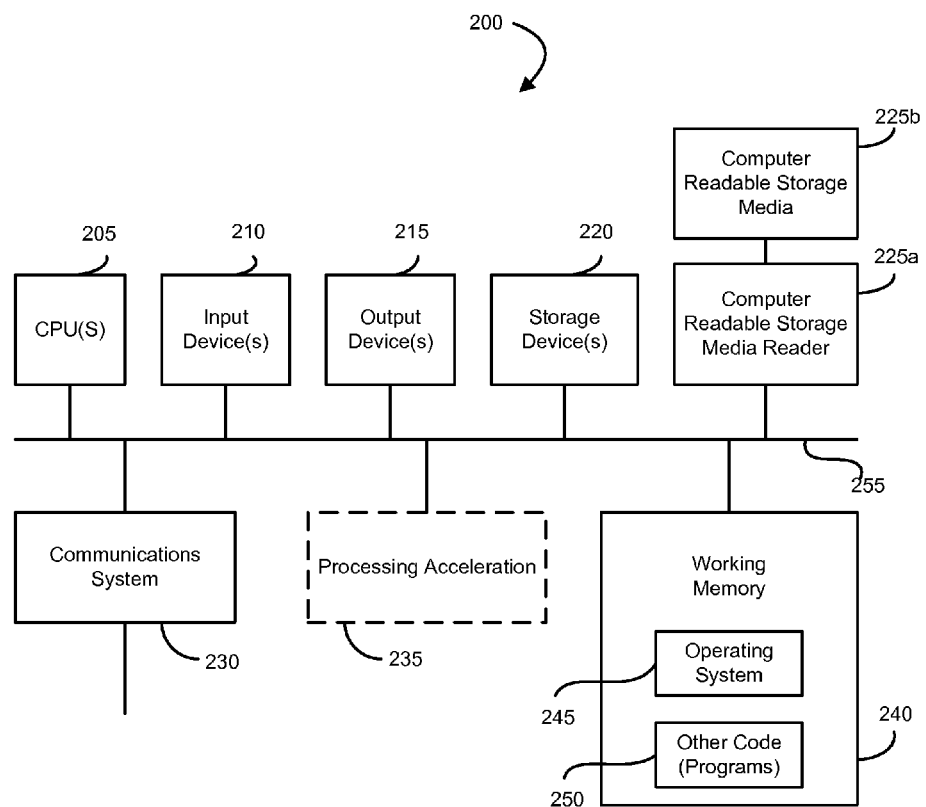
FIG. 2 illustrates a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225*a*, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225*a* can further be connected to a computer-readable storage medium 225*b*, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

The following methods may be implemented by a computer system, such as computer system 200 in FIG. 2. Each step of these methods may be done automatically by the computer system, and/or may be provided as inputs and/or outputs to a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a Web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Therefore, it will be understood in light of this disclosure, that each step and each method described herein may be altered to include an input and output to and from a user, or may be done automatically by a computer system.

Figure 3:
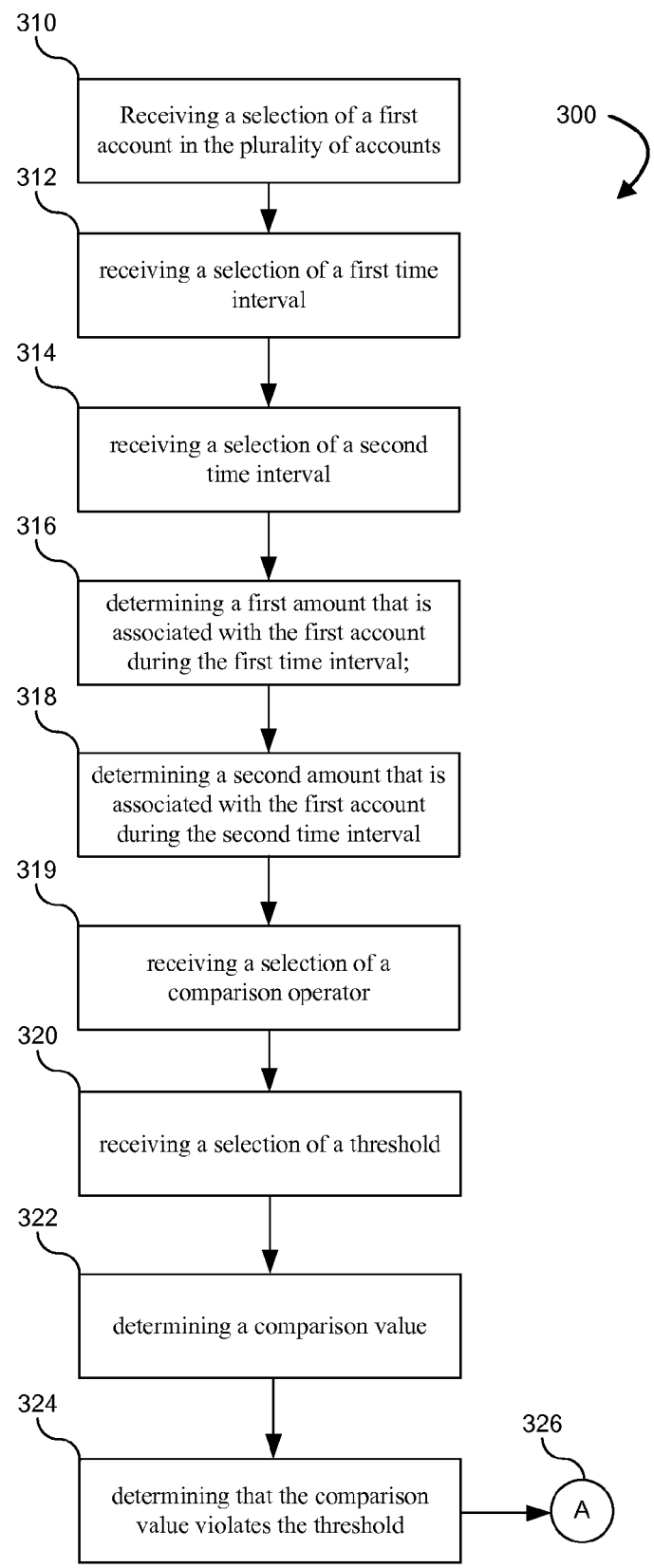
FIG. 3 illustrates a flowchart of a method of detecting variances in a plurality of accounts from different organizations within an enterprise financial accounting system, according to one embodiment.

FIG. 3 illustrates a flowchart 300 of a method of detecting variances in a plurality of accounts from different organizations within an enterprise financial accounting system, according to one embodiment. The method includes receiving a selection of a first account in the plurality of accounts (310). In one embodiment, the plurality of accounts may come from a plurality of different organizations and/or departments within an enterprise. Also in one embodiment, the first account may have an account type. The account type may be an asset, liability, or owner's equity. In some embodiments, the account type may be further subdivided into subtypes such as expenses, income, accounts payable, accounts receivable, and/or the like. The selection of the first account may be made by a user, or may be chosen automatically based on predetermined criteria, such as accounts that exceed a threshold balance. In one embodiment, multiple accounts in addition to the first account may also be selected from the plurality of accounts, such that multiple accounts may be monitored at the same time.

According to one embodiment, multiple accounts may be grouped together to form a single account for the purposes of monitoring. For example, multiple travel expense accounts may be combined together into a single expense account. This may allow an account manager to monitor the activity in all travel expense accounts throughout an enterprise in a single operation and according to a single metric. In some cases, one account may belong to one or more account groups. Accounts belonging to multiple groups may therefore have their effects shown in multiple entries in the account monitoring interface.

The method may further include receiving a selection of a first time interval (312). In one embodiment, the first time interval may comprise an accounting period, such as a month, a fiscal quarter, a fiscal year, or the lifetime of a specific operation or asset. In some embodiments, the first time interval may include the current date, such as month-to-date, quarter-to-date, and/or year-to-date. In another embodiment, the first time interval may be defined by receiving a selection of a start date and end date. Thus, a user may select any time period as the first time interval. In yet another embodiment, the first time interval may be selected from predetermined time intervals from an interface control such as a drop down box.

The method may further include receiving a selection of a second time interval (314). In one embodiment, the second time interval may also comprise an accounting period similar to the first time interval. In another embodiment, the second time interval may be the accounting period immediately prior to the first time interval. For example, if the first time interval is comprised of the month-to-date, the second time interval may be the preceding month-to-date. In another embodiment the second time interval may be the accounting period one year prior to the first time interval. For example, if the first time interval is comprised of the month of November 2012, the second time interval may be comprised of the month of November 2011. As with selecting the first time interval, some embodiments may receive a selection of two dates defining the second time interval, while other embodiments may receive a selection from a set of predetermined accounting periods.

The method may also include determining a first amount that is associated with the first account during the first time interval (316). In one embodiment, the first amount may comprise the account balance associated with the account. For example, in an accounts payable account, the first amount may comprise the balance of the account, i.e. the total amount owed by the accounts payable. In another embodiment, the first amount may comprise a value of the associated account. For example, in an asset account the first amount may comprise the value of the asset at the end of the first time interval. In another embodiment, the first amount may be a number of transactions in the account. For example, in a travel expense account the first amount may be a number of expense transactions, or a number of trips associated with the travel expense account. In yet another embodiment, the first amount may represent a difference in the balance of the first account during the first time interval. For example, for a revenue account the first amount may be the total revenues received during the time interval, which may be calculated by subtracting the balance of the revenue account at the end of the second time interval from the balance in the revenue account at the beginning of the first time interval. In yet another embodiment, the first amount may be a peak value of the first account during the first time interval.

The method may also include determining a second amount that is associated with the first account during the second time interval (318). In some embodiments, the second amount may be similar to the first amount previously described. In one embodiment, the types of amounts that may be determined for the second amount may depend upon the type of the first amount. In one embodiment, the second amount may be of the same type as the first amount. For example, if the first amount comprises a balance in the accounts payable account at the end of the first time interval, then the second amount may comprise a balance in the accounts payable account at the end of the second time interval. Similarly, if the first amount comprises a value of an asset in an asset account at the end of the first time interval, the second amount may comprise a value of the same asset in the same asset account at the end of the second time interval. In one embodiment, a user may be presented with different options for selecting the first amount type, and then that same amount type may be used for the second amount without requiring additional inputs.

The method may further include receiving a selection of a comparison operator (319). In one embodiment, the comparison operator may relate the first amount to the second amount. In another embodiment, the comparison operator may contain a component that describes a direction of a change in the first amount compared to the second amount. For example, the comparison operator may comprise a term such as "increase" or "decrease" to describe a change in the first amount compared to the second amount. This directional term may describe the quality of the change. In another embodiment, the comparison operator may also comprise a second component describing the quantity of a change. This may be a term that describes a quantity that the first amount has changed in comparison to the second amount. For example, the comparison operator may comprise a term such as "greater than," "less than," "greater than or equal to," or "less than or equal to." In some embodiments, the comparison operator may further comprise a third component, such as a value type for a threshold. This may be a term that describes the type of value to which the change described by the first two terms should be compared. For example, the value type may be comprised of terms such as "an amount" or "a percentage."

In embodiments using each of the three described components of the of the comparison operator, each of the three components may be selected and received separately as a part of receiving a selection of the comparison operator. For example, a user may select each component separately from a selection box. In another embodiment, the three components of the comparison operator may be combined together in a single expression, and various combinations may be offered for selection. For example, combination expressions such as "increase greater than an amount" and "decrease less than a percentage" may be presented for selection. It will be understood in light of this disclosure that many different types of comparison operators may be used by various embodiments. The examples described above, particularly the description of the three components above, are merely exemplary. Other embodiments may use other expressions such as "more transactions than an amount," or "depreciated less than a percentage" and/or the like.

The method may also include receiving a selection of a threshold (320). In one embodiment, the comparison operator and the threshold may work together to evaluate the first account and determine if there is a variance in the account that could cause it to be monitored. The threshold may be determined at least in part by a value type specified in the comparison operator. For example, if the comparison operator is represented by the expression "decrease less than a percentage," then the value type of the threshold may be a percentage. By way of further example, if the comparison operator is represented by the expression "increase greater than an amount," then the value type of the threshold may be a scalar amount of the same type as the first and/or second amount. Exemplary thresholds in this case may be values such as "1,500 USD," or "150 transactions." In one embodiment, a selection of the comparison operator may be received first, then a set of valid thresholds matching a value type received as a part of the comparison operator may be presented to the user. For example, if the comparison operator is represented by the expression "decrease less than a percentage," then a list of percentages such as "5%, 7%, 10%, 15%" may be presented for selection.

The method may also include determining a comparison value by comparing the first amount to the second amount according to the comparison operator (322). In one embodiment, the comparison value may be determined by determining a mathematical operator from the comparison operator and using the first and second amounts as operands. For example, if the comparison operator is represented by the expression "increase greater than an amount," then the second amount may be subtracted from the first amount. Thus, the comparison value may be the difference between the first and second amount. By way of further example, if the comparison operator is represented by the expression "more than double," then the second amount may be multiplied by two and subtracted from the first amount. The comparison value may be the result of this operation. In light of these examples, other embodiments may use similar methods of determining a comparison value by comparing the first amount to the second amount according to the comparison operator. For example, mathematical operations such as percentages, exponentials, square roots, and/or the like may be used.

The method may additionally include determining that the comparison value violates the threshold according to the comparison operator (324). In one embodiment, this determination may be made by comparing the comparison value to the threshold. For example, if the comparison operator is represented by the expression "increase greater than an amount," and the comparison value comprises the difference between the first amount and the second amount, then the determination may be made by comparing this difference to the threshold. Thus, a difference of "$1,587,334 USD" between the balance in the first and second accounts may be compared to a threshold of "$1,500,000 USD" according to the comparison operator of "greater than" to determine that the comparison value indeed violates the threshold. It will be clear in light of this disclosure how other comparison values may be determined to violate the threshold according to the various examples discussed herein.

Figure 4:
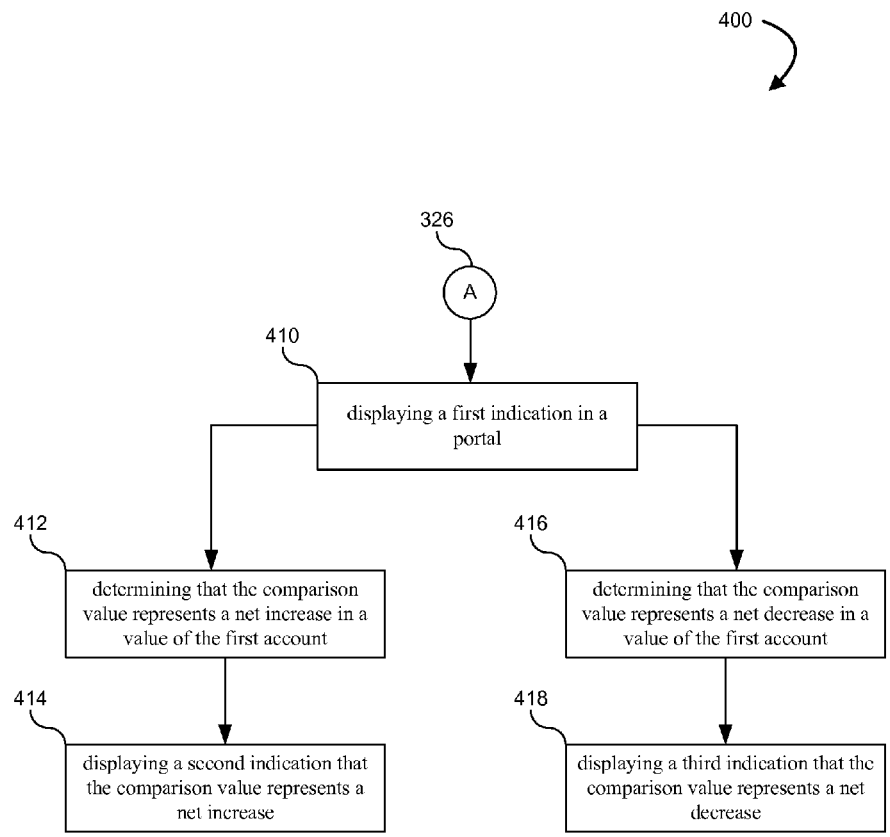
FIG. 4 illustrates a flowchart of a method for determining whether a threshold violation is desirable, according to one embodiment.

FIG. 4 illustrates a flowchart 400 of a method for determining whether a threshold violation is desirable, according to one embodiment. The method illustrated by flowchart 400 may be extension of the method illustrated by flowchart 300 from FIG. 3 and may be connected by element "A" 326. The method may include displaying a first indication (410). In one embodiment, the indication may be displayed in response to a determination that the comparison value violates the threshold. In another embodiment, the first indication may be displayed in a portal of an Enterprise Financial Accounting system. In yet another embodiment, the indication may be comprised of an entry in a table that includes one or more of the following: a description of the first account, a description of the first time interval, a description of the second time interval, the first amount, the second amount, a representation of the comparison operator, a representation of the comparison value, and/or the like. The indication may be textual, graphical, or a combination of these and/or other display types. An example of an interface implementing providing the first indication is discussed herein below in connection with FIG. 7 through FIG. 9.

In addition to using a comparison operator and a threshold to determine whether an indication should be displayed in an account monitoring interface, a second indication may be displayed based on whether the violation of the threshold represents an increase in the value of the monitored account. For example, an account manager may set comparison operators and thresholds for many accounts and/or groups of accounts. It may be common for many of these accounts to violate their respective thresholds, and therefore have an indication displayed in the account monitoring interface. However, it may be beneficial for the account manager to be able to quickly inspect a second indication related to each account to determine whether each threshold violation is a "good" (desirable) violation or a "bad" (undesirable) violation.

The method may further include determining that the comparison value represents a net increase in the value of the first account based on the account type of the first account (412). As discussed earlier, the first account may have an account type or account subtype corresponding to an asset, a liability, or to owner's equity in an accounting ledger. This account type may be used to automatically determine whether a threshold violation is desirable or undesirable. Put another way, the account type may be used to automatically determine whether there has been a net increase in the expected value of the account to an organization.

For example, if an account with the type "asset" violates a threshold and comparison operator represented by the expression "increase greater than $5,000 USD," then this threshold violation may be considered a net increase in a value of the asset. In other words, the value of the asset may have appreciated between the second time interval and the first time interval. As another example, the account type of the first account may be a liability, such as an accounts payable account. If the change in this account violates a threshold and comparison operator represented by the expression "decrease greater than $5,000 USD," then this threshold violation may also be considered a net increase in the expected value of the accounts payable account. In other words, when the balance of the accounts payable account decreases over time an organization may owe less money to creditors, and therefore be more valuable.

After determining that the comparison value represents a net increase in the expected value of the first account, the method may further include displaying a second indication that the comparison value represents a net increase (414). In one embodiment, the second indication may comprise changing the color of the text display, including text displayed as a part of the first indication. For example, detecting a net value increase may include changing the color of the comparison value displayed in a table of an account monitoring interface to green, or any other color that may be used to signify a positive event. In another embodiment, the second indication may include a sound output in response to a selection of the first account in an account monitoring interface. In yet another embodiment, the second indication may include a graphic displayed as a part of, or next to, the first indication. For example, a green upward-pointing arrow may be displayed next to the comparison value. In other embodiments, other types of graphical indicators may be used such as icons, emoticons, and/or the like.

In addition to determining a net increase in a value of the first account, the method may also include determining that the comparison value represents a net decrease in the expected value of the first account (416). For example, if an account with the type "asset" violates a threshold and comparison operator represented by the expression "decrease greater than $5,000 USD," then this threshold violation may be considered a net decrease in the expected value of the asset. In other words, the value of the asset may have depreciated between the second time interval and the first time interval. As another example, the account type of the first account may be a liability, such as an accounts payable account. If the change in this account violates a threshold and comparison operator represented by the expression "increase greater than $5,000 USD," then this threshold violation may also be considered a net decrease in the expected value of the accounts payable account. In other words, when the balance of the accounts payable account increases over time, an organization may owe more money to creditors, and therefore be less valuable.

After determining that the comparison value represents a net decrease in the expected value of the first account, the method may further include displaying a third indication of the net decrease (418). Like the second indication displayed when the comparison value represents a net increase, the third indication may indicate the net decrease in a similar way. Thus, the third indication may change the text of the first indication red, or any other color indicating a negative event. In another embodiment, the third indication may display a graphical icon such as a red downward-pointing arrow indicating the net value has decreased. The third indication may be configured based on the second indication, such that the distinction between the two is clear to a user. For example, the first and second indications may be opposing colors such as black and white, green and red, or blue and red. In another embodiment the first and second indications may be opposing symbols such as arrows with opposite directions, plus and minus symbols, or any other symbols that convey opposing messages.

It should be appreciated that the specific steps illustrated in FIG. 3 and FIG. 4 provide a particular method of detecting and displaying account variances according to an embodiment of the present invention. Other sequences of steps may also be performed according to alternative embodiments. For example, alternative embodiments of the present invention may perform the steps outlined above in a different order. Moreover, the individual steps illustrated in FIG. 3 and FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
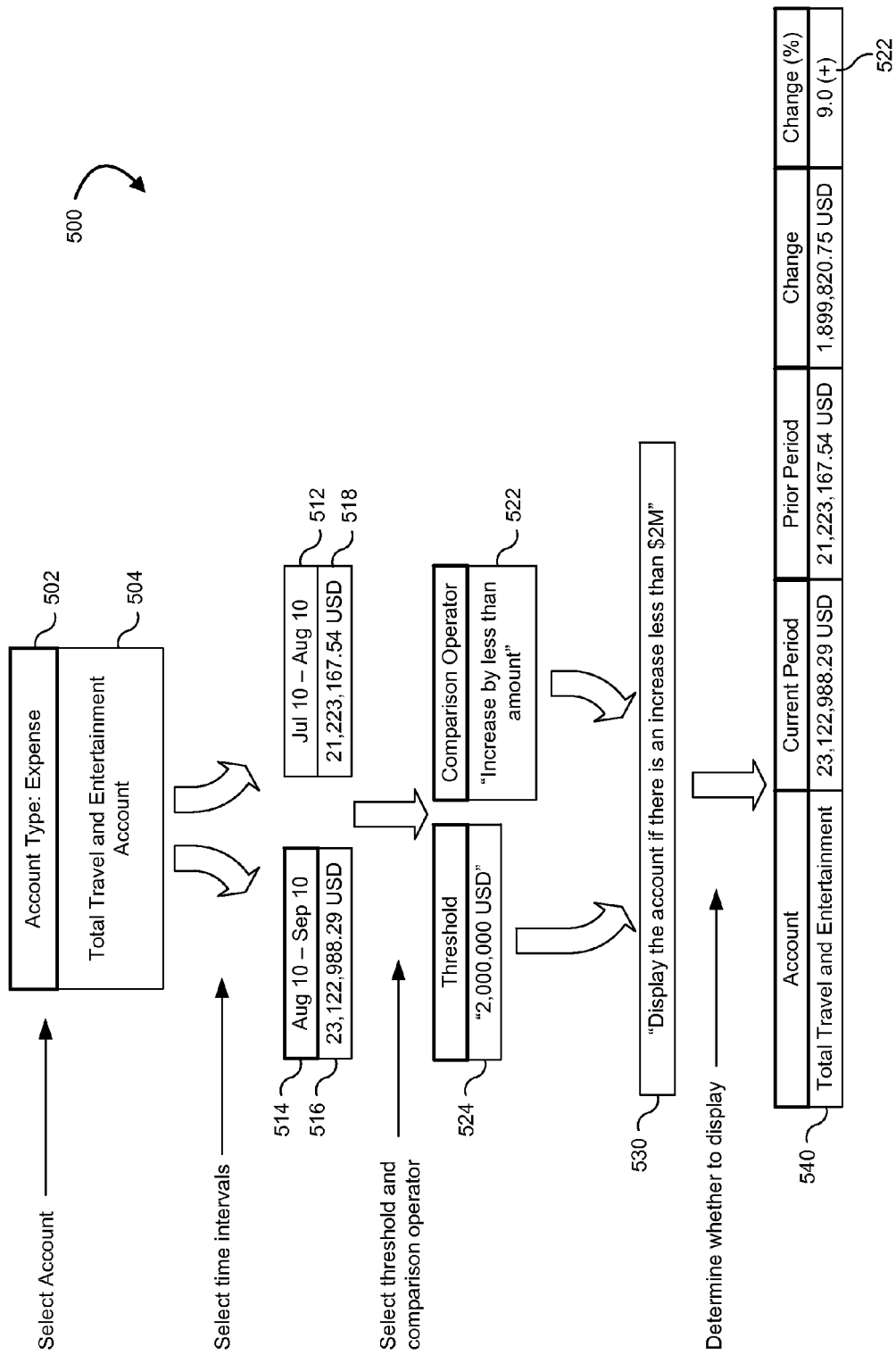
FIG. 5 illustrates a flow diagram of an example process for monitoring an account for variances, according to one embodiment.

FIG. 5 illustrates a flow diagram 500 of an example process for monitoring an account for variances, according to one embodiment. A first account 504 may be selected from among a plurality of accounts from various sources. The first account 504 may have an account type. In this example, the first account 504 is a total travel and entertainment account, with the account type 502 of "expense." The total travel and entertainment account may be a grouping of accounts. For example, this account may be a grouping of all travel and entertainment expense accounts within a department or within an organization. As it may be shown later, it may be possible in some embodiments to drill down into a group account and determine threshold violations for the individual accounts therein.

After the first account has been selected, a first time interval 514 and a second time interval 512 may be received. In this example, the first time interval 514 corresponds to the month beginning on August 10 and ending on September 10. The second time interval 512 corresponds to the month beginning on July 10 and ending on August 10. After the first time interval 514 and the second time interval 512 have been selected, an amount may be determined for each time interval. In this example, the first amount 516 corresponds to $23,122,988.29 USD. The second amount 518 corresponds to $21,223,167.54 USD. These amounts may correspond to a total amount of new expenses charged to various travel and entertainment accounts within the organization during the first and second time intervals. In one embodiment, the first and second amounts may be determined automatically by a computer system without requiring additional inputs.

Additionally, a selection of a threshold 524 and a comparison operator 522 may also be received. In this example, a threshold 524 of $2,000,000 USD and a comparison operator 522 of "increase by less than amount" have been selected. Next, the change value may be determined based on the comparison operator 522. In this example, because the comparison operator is looking for an increase that is less than an amount, the second amount 518 may be subtracted from the first amount 516 to determine the comparison value of $1,899,820.75 USD. In order to determine whether the threshold 524 has been violated according to the comparison operator 522, the comparison value may be compared to the threshold 524 to determine if the increase is greater than $2,000,000. In this example, detecting a threshold violation may be represented by the expression 530 "display the account if there is an increase less than $2,000,000." Because the comparison value is less than the threshold value, the first account 504 may be displayed in a table 540 within an account monitoring interface.

Displaying a first indication in response to determining the comparison value violates the threshold may be implemented by providing table 540. Table 540 may be used to display information related to the first account 504 and any other accounts that are being monitored that violate a threshold. The indication displayed may be configured to provide a user with relevant outputs needed to quickly assess the status of the accounts. In another embodiment, the first indication may comprise a list of account names with a percent change or an amount change. This may provide a minimum amount of information required for meaningful assessment. In another embodiment, the first indication may comprise a full listing of information regarding the first account 504, including accounts within an account group. The full listing of information regarding the first account 504 may include any of the fields, identifiers, selections, and/or determinations discussed herein.

In addition to displaying the first indication for the first account 504 in the account monitoring interface, a second indication classifying the threshold violation as "good" or "bad" and also be provided in the same interface. In this example, because the account type 502 of the first account 504 identifies the first account 504 as an expense, an increase by greater than the threshold amount would reflect a net decrease in the expected value of the first account 504. However, here the comparison operator is detecting an increase by less than an amount. The situation may occur when an expense account is expected to grow between the second time interval in the first time interval. This threshold and comparison operator would then detect that it grew less than expected, which as an expense account could indicate a net increase in the value of the account compared to what was expected, classifying this as a good type of threshold violation. The second indication 542 may be provided signifying a good violation, such as the plus sign displayed next to the first indication in table 540.

Figure 6:
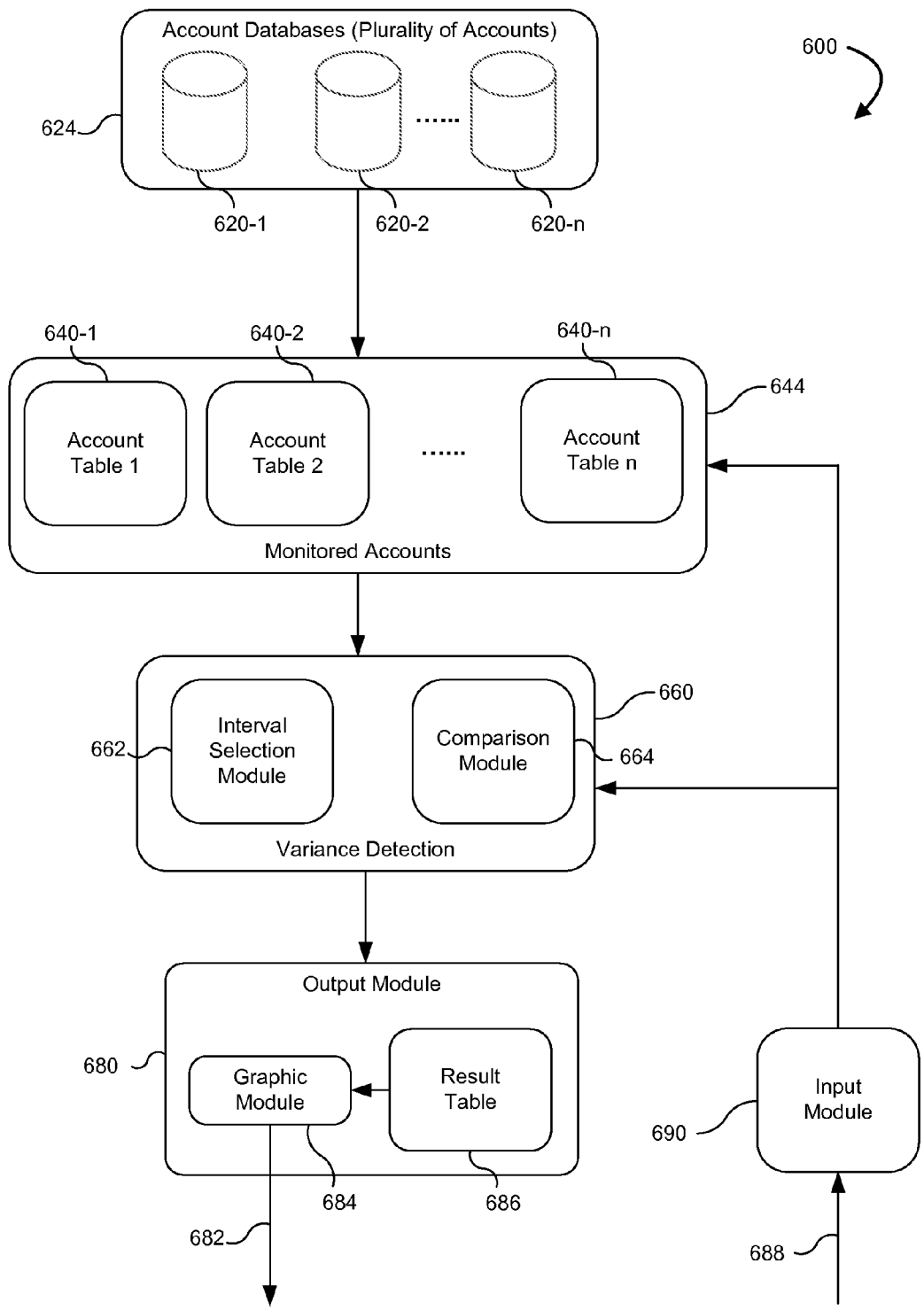
FIG. 6 illustrates a block diagram of a system for detecting account variances, according to one embodiment.

FIG. 6 illustrates a block diagram 600 of a system for detecting account variances, according to one embodiment. A plurality of accounts 624 may be comprised of a plurality of account databases 620. Each of the plurality of account databases 620 may come from separate sources, such as separate departments, separate organizations, separate geographical locations, and/or different levels of an organizational hierarchy. From the plurality of accounts 624, one or more accounts may be selected as monitored accounts 644. The monitored accounts 644 may include a first account, along with additional accounts. Each account may be represented by one or more account tables 640. Each of the account tables 640 may be an entry in a database, and may be referenced by the account monitoring interface in its original database location without copying information to a new location. On the other hand, some embodiments may create a dynamic copy of the account tables 640 for each of the monitored accounts 644 in a central location where the account monitoring interface is provided. In one embodiment, a copy of the account tables 640 could be dynamically updated as the original accounts in the account databases 620 are updated.

A variance detection module 660 may be used to select among the monitored accounts 644 and determine those accounts which should be displayed in the account monitoring interface. In one embodiment, and interval selection module 662 may receive a selection of the first interval and the second interval. The interval selection module 662 may further determine the first and second amounts associated with the first and second intervals, as described previously. The comparison module 664 may be provided to accept a selection of a threshold and the comparison operator, and to use the threshold in comparison operator to determine if one or more of the monitored accounts 644 should be displayed in the account monitoring interface. Furthermore, the comparison module 664 may also determine whether any threshold violations should be classified as a net increase in expected value, or a net decrease in expected value (good or bad).

An output module 680 may be provided to receive the first and second indications generated by the variance detection module 660. The output module may contain a result table 686 where the first and second indications may be formatted to convey necessary information to a user. The result table 686 may be comprised of a separate table in memory containing live data or data references to the account tables 640. In another embodiment, the result table 686 may be dynamically generated for display by retrieving information from the account tables 640 and making runtime calculations. In this situation, no additional database entries would need to be created by the account monitoring interface. A graphic module 648 may be used to render the result table 686 into a viewable form and to provide graphical indications such as those that may be used by the second indication to display the classification of a threshold violation. For example, the graphic module 684 may generate icons and other visual displays that may be useful in rapidly assessing the status of the account. The graphic module 684 may provide an output 682 to a display device of a computer system, such as those described above in relation to FIG. 2.

An input module 690 may also be provided using any of the input devices described above in relation to FIG. 2. An input 688 may be received by the input module 690 and may be used to select one or more of the monitored accounts 644. The input 688 may also be used to select a threshold and a comparison operator for the comparison module 664. The input 688 may also perform other operations such as selecting one of the monitored accounts for which additional information should be displayed, i.e. a drill down action.

In one embodiment, the various modules in FIG. 6 may reside on separate computer systems. Alternatively, multiple modules may be combined on the same or similar computer systems. In addition, some modules may be combined together into a single module performing the functions of both individual modules. Similarly, a single module may be split into multiple modules. It will be understood in light of this disclosure that any arrangement of the modules, as well as any implementation in both software and hardware, may be used by various embodiments.

Figure 7:
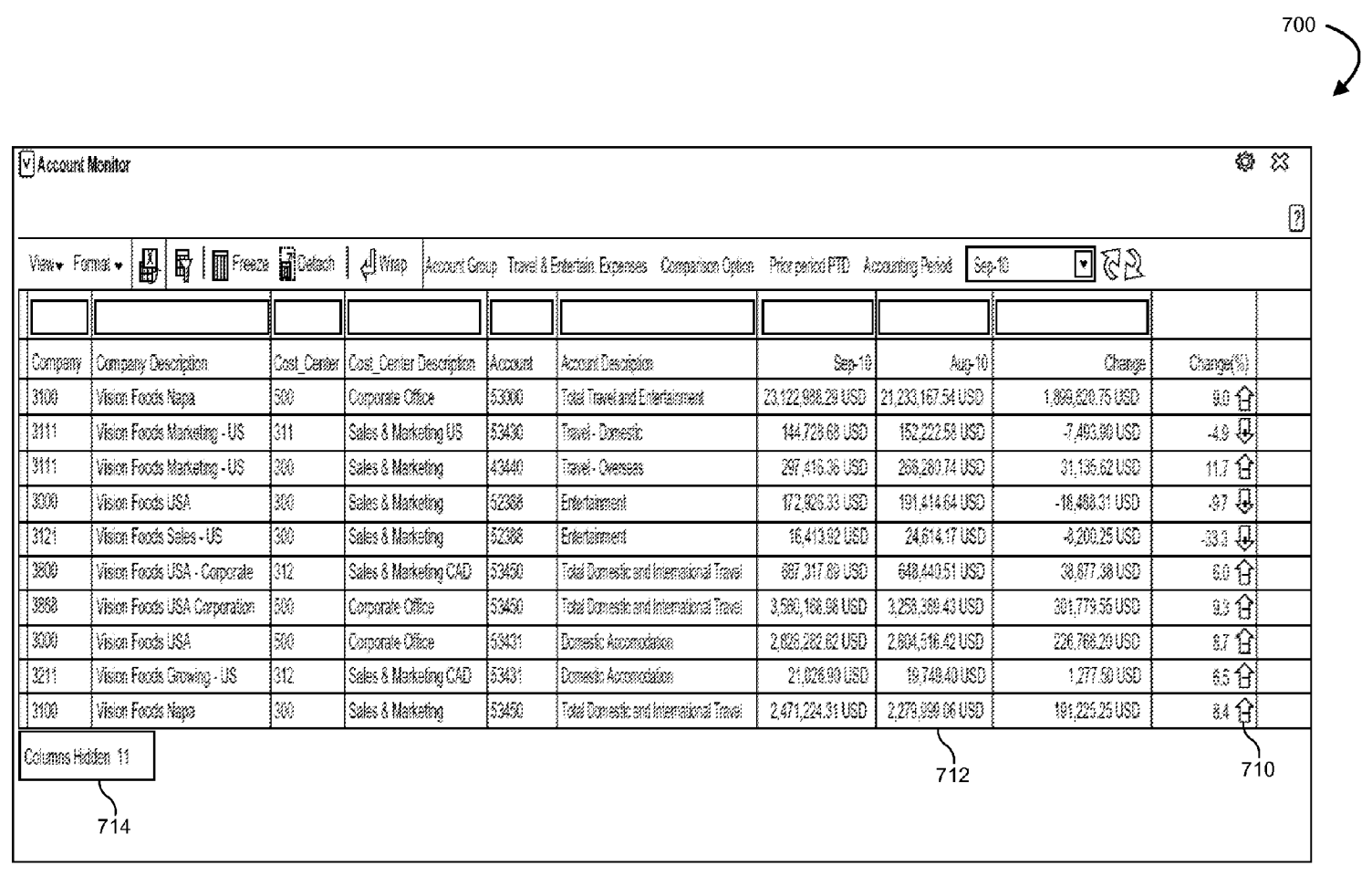

FIG. 7 illustrates an interface 700 that may be used as an account monitoring interface, according to one embodiment. Interface 700 may be a single region in a larger dashboard or larger financial reporting center. Interface 700 may receive data that is automatically pushed to a user for key accounts that have been predetermined to be of interest and thus valuable to monitor. In one embodiment, every account or group of accounts listed in the table of interface 700 may be one that violates a threshold. A user may select among all of the information available for each of the accounts and determine what information should be displayed in the account monitoring interface. In this example, a company, a company description, a cost center, a cost center description, an account, an account description, a first-time interval, a second time interval, a change amount, and a change percent may be displayed as part of the first indication 712 for each account. The second indication 710 is a directional arrow with a plus or a minus sign enclosed therein. Because these are all expense accounts, the upward facing arrow with a minus sign in it and may be colored red to indicate that the increase in the balance of the expense accounts represents a net decrease in expected value. Conversely, the downward facing arrows with the plus sign embedded therein represent of the expense account balance has decreased, and thus the net value has increased.

Indicator 714 may indicate to a user that a number of columns may be hidden representing additional information that may be displayed for each of the monitored accounts. Additionally, more accounts or groups of accounts (rows in the table) may violate a threshold that can be displayed at once. Thus, the user may be able to scroll down in order to see the additional rows. In one embodiment, accounts may be ordered and/or displayed according to predetermined preferences. For example, accounts with the largest percentage change may be displayed at the top and/or made visible most prominently. In another embodiment, accounts with the largest threshold violation may be displayed at the top and/or be more prominently displayed. In yet another embodiment, expense accounts that increase more than expected may be displayed preferentially over expense accounts that increase less than expected. Similarly, equity and asset accounts that increase or decrease more than expected may be preferentially displayed over equity and asset accounts that increase or decrease less than expected.

Figure 8:
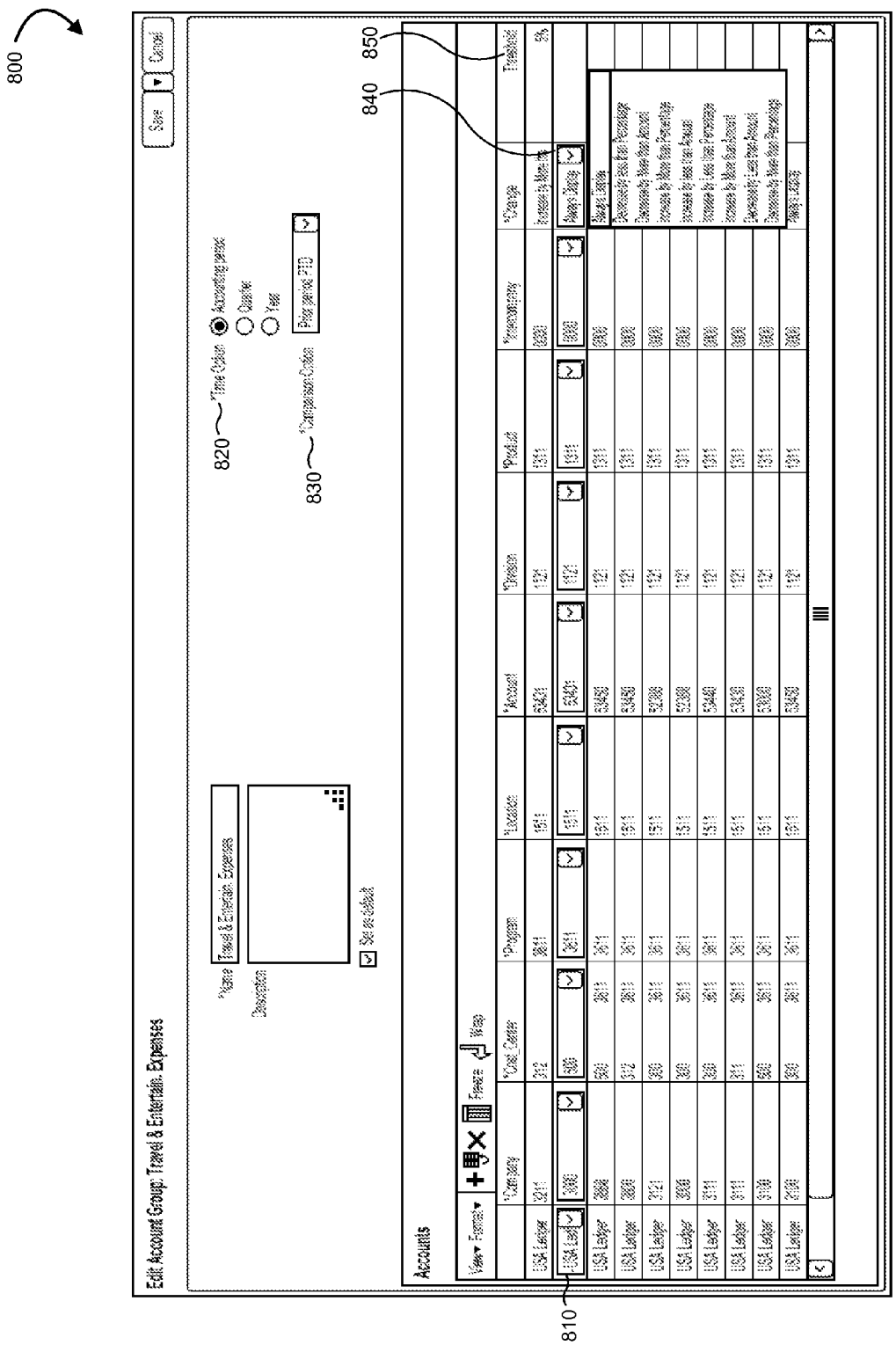
FIG. 8 illustrates an interface that may be used to select a first account, a threshold, and/or a comparison operator, according to one embodiment.

FIG. 8 illustrates an interface 800 that may be used to select a first account, a threshold, and/or a comparison operator, according to one embodiment. In this example, the first account is actually a group of accounts under the single name of "travel and entertainment expenses." A user may select accounts 810 from a variety of sources to include within the account group. Each account may have various options that may be selected using drop-down boxes as illustrated in FIG. 8. Interface 800 may also contain selection controls 820 that may be used to select a first time interval, along with selection controls 830 that may be used to select a second time interval. Depending on what a user selects for the first time interval, the selection controls 830 for the second time interval may populate the drop-down box with appropriate values that depend from the selection the first time interval. Selection controls 840 may include a drop-down box for selecting a comparison operator. Note that in this example, a comparison operator with three components is used, and each of the eight permutations is listed in text form in the drop-down box. Furthermore, a text entry field 850 is provided for the user to enter the threshold value. Depending on the choice of the comparison operator, a value entered into the text entry field 850 may be formatted accordingly. For example, if the comparison operator is "decrease by less than percentage," then the numeral "5" entered into the text entry field 850 may be formatted as "5%".

Figure 9:
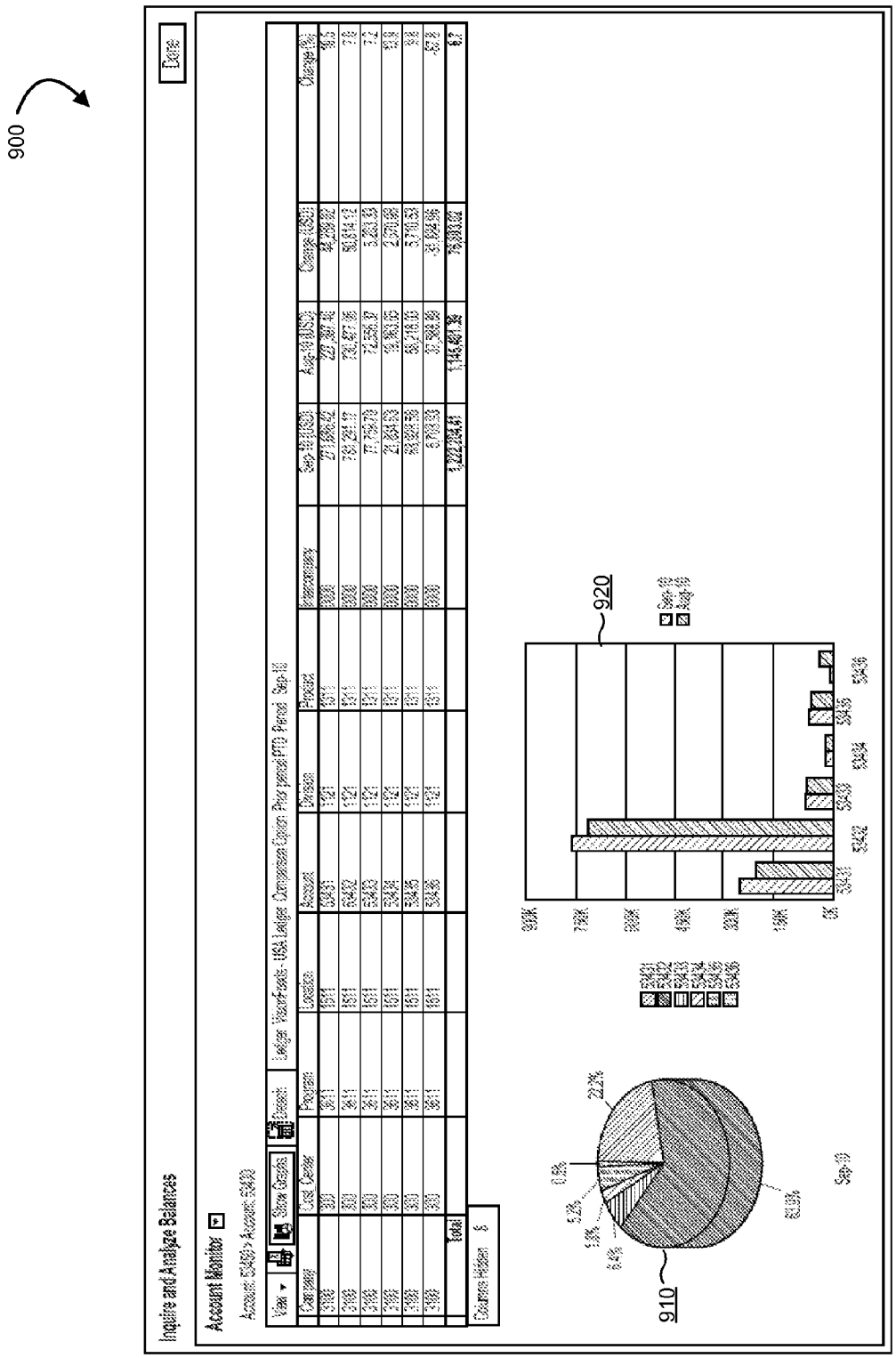
FIG. 9 illustrates an interface that may be used to drill down into account groups to evaluate individual accounts, according to one embodiment.

FIG. 9 illustrates an interface 900 that may be used to drill down into account groups to evaluate individual accounts, according to one embodiment, from the account monitoring interface shown in FIG. 7. The user may select one or more of the accounts by clicking on a hyperlink associated with its description or any other descriptive field. For example, if one account was monitoring a group of accounts titled "California wine sales," then a user may drill down on this group to get a breakdown of the comparative balances for San Francisco, Napa, Monterey, and Santa Barbara. In some embodiments, users can pivot to other dimensions while drilling down to get a similar breakdown. In this example, a graph 910 is displayed showing the revenue for each subaccount in the account group. It will be understood in light of this disclosure that many other graphical displays may be used.

In one embodiment, the selected component for each subaccount in the group of accounts may be displayed with both time intervals for comparison. For example, bar graph 920 shows the revenues for each subaccount for both time intervals. In one embodiment, it may be determined how much each subaccount contributes to the threshold violation. For example, the threshold may be divided into equal portions based on the number of subaccounts, and the divided threshold may be compared to each subaccount. Although not shown in FIG. 9, bar graph 920 may additionally show the change percentage for each subaccount along with the divided threshold. This may provide for in-depth yet rapid analysis to determine whether a single account is responsible for the threshold violation or whether the entire group has increased or decreased the net expected value of the group account.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of detecting variances in a plurality of accounts from different organizations within an Enterprise Financial Accounting system, the method comprising:

accessing a plurality of financial accounts, wherein the plurality of financial accounts are provided by different organizations throughout an enterprise;

for each first account in the plurality of financial accounts:
receiving, by a computer system a selection of a first time interval;
receiving, by the computer system, a selection of a second time interval;
determining, by the computer system, a first amount that is associated with the first account during the first time interval, wherein the first account is associated with an account type;
determining, by the computer system, a second amount that is associated with the first account during the second time interval;
receiving, by the computer system, a selection of a comparison operator, wherein the comparison operator relates the first amount to the second amount;
receiving, by the computer system, a selection of a threshold associated with the account;

determining, by the computer system, a comparison value by comparing the first amount to the second amount according to the comparison operator; and determining, by the computer system, whether the comparison value violates the threshold according to the comparison operator; and generating, by the computer system, an interface configured to display together indications for each of the plurality of financial accounts where the comparison value violates the threshold, wherein:

each of the indications comprises:
the first amount;
the second amount;
the comparison value; and
a graphical indicator that illustrates whether the comparison value is positive or negative; and financial accounts with comparison values that do not violate their associated thresholds are omitted from the interface.

2. The method of claim 1 further comprising:
determining that the comparison value represents a net increase in an expected value of the first account based on the account type of the first account; and
displaying a second indication in response to determining that the comparison value represents the net increase.

3. The method of claim 2 wherein:
the account type of the first account comprises an expense or a liability; and
the comparison value comprises a decrease in a balance of the first account.

4. The method of claim 2 wherein:
the account type of the first account comprises an asset or a revenue; and
the comparison value comprises an increase in a balance of the first account.

5. The method of claim 2 wherein the second indication comprises changing a color of a text display.

6. The method of claim 1 further comprising:
determining that the comparison value represents a net decrease in an expected value of the first account based on the account type of the first account; and
displaying a third indication in response to determining that the comparison value represents the net decrease.

7. The method of claim 6 wherein:
the account type of the first account comprises an expense or a liability; and
the comparison value comprises an increase in a balance of the first account.

8. The method of claim 6 wherein:
the account type of the first account comprises an asset or a revenue; and
the comparison value comprises a decrease in a balance of the first account.

9. The method of claim 1 wherein the first time interval comprises an accounting period.

10. The method of claim 1 wherein the first amount comprises a balance in the first account.

11. The method of claim 1 wherein the comparison operator at least in part determines a percentage change between the first amount and the second amount.

12. A non-transitory computer-readable memory having stored thereon a sequence of instructions which, when executed by one or more processors, causes the one or more processors to detect variances in a plurality of accounts from different organizations within an Enterprise Financial Accounting system by:

accessing a plurality of financial accounts, wherein the plurality of financial accounts are provided by different organizations throughout an enterprise;

for each first account in the plurality of financial accounts:
receiving a selection of a first time interval;
receiving a selection of a second time interval;
determining a first amount that is associated with the first account during the first time interval, wherein the first account is associated with an account type;
determining a second amount that is associated with the first account during the second time interval;
receiving a selection of a comparison operator, wherein the comparison operator relates the first amount to the second amount;
receiving a selection of a threshold associated with the account;
determining a comparison value by comparing the first amount to the second amount according to the comparison operator; and
determining whether the comparison value violates the threshold according to the comparison operator; and generating an interface configured to display together indications for each of the plurality of financial accounts where the comparison value violates the threshold, wherein:

each of the indications comprises:
the first amount;
the second amount;
the comparison value; and
a graphical indicator that illustrates whether the comparison value is positive or negative; and financial accounts with comparison values that do not violate their associated thresholds are omitted from the interface.

13. The non-transitory computer-readable memory according to claim 12, wherein the instructions further cause the one or more processors to detect variances in a plurality of accounts from different organizations within an Enterprise Financial Accounting system by:
determining that the comparison value represents a net increase in an expected value of the first account based on the account type of the first account; and
displaying a second indication in response to determining that the comparison value represents the net increase.

14. The non-transitory computer-readable memory according to claim 13, wherein:
the account type of the first account comprises an expense or a liability; and
the comparison value comprises a decrease in a balance of the first account.

15. The non-transitory computer-readable memory according to claim 13, wherein:
the account type of the first account comprises an asset or a revenue; and
the comparison value comprises an increase in a balance of the first account.

16. The non-transitory computer-readable memory according to claim 12, wherein the instructions further cause the one or more processors to detect variances in a plurality of accounts from different organizations within an Enterprise Financial Accounting system by:
determining that the comparison value represents a net decrease in an expected value of the first account based on the account type of the first account; and
displaying a third indication in response to determining that the comparison value represents the net decrease.

17. The non-transitory computer-readable memory according to claim 13, wherein:
the account type of the first account comprises an expense or a liability; and
the comparison value comprises an increase in a balance of the first account.

18. The non-transitory computer-readable memory according to claim 13, wherein:
the account type of the first account comprises an asset or a revenue; and
the comparison value comprises a decrease in a balance of the first account.

19. A system comprising:
one or more processors; and
a memory communicatively coupled with and readable by the one or more processors and having stored therein a sequence of instructions which, when executed by the one or more processor, cause the one or more processor to detect variances in a plurality of accounts from different organizations within an Enterprise Financial Accounting system by:
accessing a plurality of financial accounts, wherein the plurality of financial accounts are provided by different organizations throughout an enterprise;
for each first account in the plurality of financial accounts:
receiving a selection of a first time interval;
receiving a selection of a second time interval;
determining a first amount that is associated with the first account during the first time interval, wherein the first account is associated with an account type;
determining a second amount that is associated with the first account during the second time interval;
receiving a selection of a comparison operator, wherein the comparison operator relates the first amount to the second amount;
receiving a selection of a threshold associated with the account;
determining a comparison value by comparing the first amount to the second amount according to the comparison operator; and
determining whether the comparison value violates the threshold according to the comparison operator; and
generating an interface configured to display together indications for each of the plurality of financial accounts where the comparison value violates the threshold, wherein :
each of the indications comprises:
the first amount;
the second amount;
the comparison value; and
a graphical indicator that illustrates whether the comparison value is positive or negative; and
financial accounts with comparison values that do not violate their associated thresholds are omitted from the interface.

20. The system of claim 19 wherein the comparison operator at least in part determines a percentage change between the first amount and the second amount.

* * * * *

UNITED STATES PATENT AND TRADEMARK OFFICE
CERTIFICATE OF CORRECTION

| | | |
|---|---|---|
| PATENT NO. | : 9,477,986 B2 | Page 1 of 1 |
| APPLICATION NO. | : 13/477862 | |
| DATED | : October 25, 2016 | |
| INVENTOR(S) | : Imad Jabbour et al. | |

It is certified that error appears in the above-identified patent and that said Letters Patent is hereby corrected as shown below:

On the Title Page

Item (75), Inventors:
Remove "Hyderbad" and replace with --Hyderabad--

In the Specification

In the DETAILED DESCRIPTION
Column 11, Line 13:
Remove "of the of the" and replace with --of the--

In the Claims

Column 18, Line 52:
Remove "system" and replace with --system,--

Signed and Sealed this
Twenty-eighth Day of May, 2019

Andrei Iancu
*Director of the United States Patent and Trademark Office*